United States Patent [19]

Duggan

[11] 4,006,386
[45] Feb. 1, 1977

[54] MONITOR AND SAFETY DEVICE FOR COIL SHIFTING CIRCUIT

[76] Inventor: Gene Duggan, 4403 Cresthill Drive SW., Roanoke, Va. 24018

[22] Filed: June 10, 1975

[21] Appl. No.: 585,692

[52] U.S. Cl. .................................. 317/5; 317/136; 317/155.5
[51] Int. Cl.² ........................................ H01H 47/00
[58] Field of Search ........ 317/5, 136, 137, 148.5 B, 317/155.5; 318/284

[56] References Cited

UNITED STATES PATENTS

| 2,990,506 | 6/1961 | Montross | 318/284 |
| 3,704,382 | 11/1972 | Huntzinger | 317/5 |

Primary Examiner—Harry Moose

[57] ABSTRACT

A monitor and safety device for a direct current voltage coil shifting circuit conventionally used with a shifting mechanism having two coils, one to control rotation of a drive shaft in one direction and the other to control rotation of the drive shaft in the other direction. The device monitors the current through the shifting mechanism coils and is effective, when the shaft is running in one direction above a predetermined rpm level to electronically disengage the other shifting coil circuit so that, as long as the shaft turns in that direction above the predetermined rpm level, it cannot accidentally be shifted; and, also, so that, if the coil controlling the shaft rotation in the direction it is turning is accidentally disengaged, it cannot be re-engaged until the rpm's have been reduced to or below the predetermined rpm level. The device includes an rpm detector to sense the rpm's of the shaft and to provide a corresponding voltage which is an electronic replica of the rpm's of the shaft and which is used to trigger a speed interlock circuit when the rpm's are above the predetermined level.

4 Claims, 1 Drawing Figure

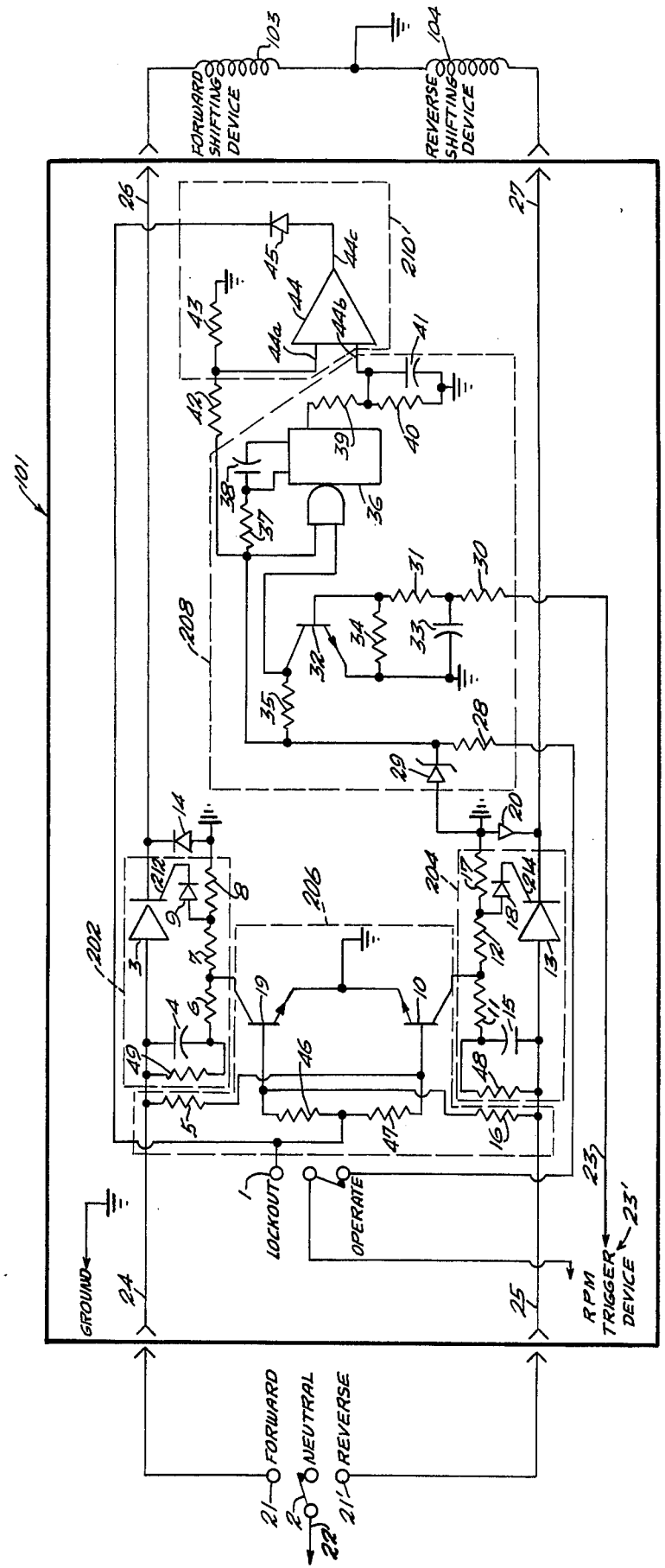

MONITOR AND SAFETY DEVICE FOR COIL SHIFTING CIRCUIT

FIELD OF THE INVENTION

This invention relates to a monitor and safety device for a direct current electric coil shifting circuit which is conventionally used with a shifting mechanism having two coils, one to control rotation of a drive shaft in one direction and the other to control rotation of the drive shaft in the other direction, and which is effective to lock out electrical energy to the coils when the shaft is unintentionally disengaged from driven connection with a power source which lock-out condition remains so long as the shaft is being rotated above a predetermined level of rpm's.

BACKGROUND OF THE INVENTION

Mechanical damage may be caused when a shaft turning at a high rate of rpm's is disengaged and, before it has slowed down is re-engaged or shifted to the other direction of rotation. For example, if the operator for a drive shaft mechanism is accidentally and suddenly thrown into reverse while the machine is running in a forward direction at a relatively high rpm, the sudden shifting will place stresses and strains upon the drive shaft and operating mechanism causing damage. The present invention is of an electrical monitoring and safety device for an electrical coil shifting circuit to guard against such damage. The device provides protection to the mechanical drive mechanism associated with the coil shifting circuits, one a forward circuit and the other a rearward circuit, causing a rapid shut-down of the shifting circuits by the monitoring device. The main purpose of the monitoring device is to isolate the mechanical portion of a drive system whenever there is an electrical malfunction either by loss of applied voltage or ground return.

For example, in a situation where a drive shaft is rotating at a high rpm and the drive means is disengaged, if it is re-engaged before the rpm's are reduced below a certain level, damage is likely to occur. With the present invention, the rpm's are monitored to lock out the shifting circuit, so that it will not re-engage until the rpm's have been lowered below a predetermined level, one chosen at which damage is not likely to occur.

It is, accordingly, an object of this invention to provide a monitor and safety device for a coil shifting circuit.

DESCRIPTION OF THE DRAWING

The drawing is of a circuit which comprises the monitor and safety device for the coil shifting circuits.

GENERAL DESCRIPTION OF THE PREFERRED EMBODIMENT

Referring to the Figure, generally the invention comprises a current monitoring device designated by the numeral 101 to automatically disengage the control circuitry of shifting coils 103 and 104 which are connected in a main circuit through lines 24 and 26, in the case of the forward shifting coil and in the case of the reverse shifting coil 104 through lines 25 and 27 which coils are operatively connected to a shaft to be rotated. An rpm trigger device 23' is provided to cause electrical impulses corresponding to rpm's. Conductor 23 conducts the signal to the device 101. The device may be viewed as including (a) a forward control circuit 202 and (b) a rearward control circuit 204, (c) a cross coupled interlock circuit means 206, (d) an rpm detector circuit 208, and (e) a speed interlock circuit 210.

The forward control circuit 202 and the reverse control circuit 204 each include a silicon control rectifier circuit including the RC network 4 and 6, and 11 and 15 comprising a gate circuit network connected to the gates 212 and 214 of the silicon control rectifiers 3 and 13. Each RC network consists of a resistor divider 6, 7 and 8 and 11, 12 and 17 and capacitors 4 and 15 which capacitors are in series with their respective resistor dividers. Each control circuit also includes a discharge resistor 48 and 49 which are in parallel with their respective associated capacitors. The forward and reverse control circuits 202 and 204 are in series in the associated lines 24 and 26 and 25 and 27 respectively connecting the forward operator terminal 21 and the forward shifting coil 103 and the reverse operator terminal 21' and the reverse shifting coil 104 of the coil shifting mechanism.

The cross coupled interlock circuit 206 consists of a first and second transistor 19 and 10, the second transistor 10 being connected through the resistor 5 to the main circuit 24, 26 and to the gate circuit of the reverse control circuit at the resistor divider 12 of the reverse control circuit. The first transistor 19 is connected through the resistor 16 ahead of the reverse control circuit and the resistor divider 7 of the gate of the forward control circuit.

The speed interlock circuit 210 is connected between the rpm detector circuit and the cross couple interlock and it consists of an operational amplifier integrated circuit used in a comparator configuration having two inputs 44a and 44b and an output 44c. One input is connected to the rpm detector and the other input is connected to a reference power supply while the output is connected to the cross couple interlock. The reference power supply is provided by a resistor divider from the main power supply.

The rmp detector circuit consists of a transistor 32 and a retriggerable one shot 36 and their associated components. The transistor is electrically connected to the rpm trigger device and to the one shot and includes a voltage divider circuit between the rpm detector and the transistor base. The one shot consists of an integrated circuit with an input and an output. The input is connected to the collector of the transistor and the output is connected to the resistor divider network and comprises means to equate pulses from the transistor collector to a fixed voltage applied to a capacitor and the comparator, so that when the pulse are of a predetermined rate current will flow to the cross couple interlock and permit current to flow to lock out the gate circuit of the associated gate circuit in the associated silicon control rectifier circuit.

DETAILED DESCRIPTION OF THE PREFERRED EMBODIMENT

The electric coil shifting circuit monitor and safety device 101 is connected in series with the terminals at the operator or shifting lever 2 and with the shifting coils 103 and 104, being connected through lines 24 and 26 and lines 25 and 27 respectively. The device is connected to ground return, line 22 connects to 12 volts and line 23 to an rpm trigger device. The circuit is not restricted to 12 volts, which is described for purposes of illustration. The magnitude of the dc voltage used is restricted only by the components which are used in the circuit design to be described.

When the lock operate switch 1 is in the operate position and the shifting lever 2 is in the forward position, voltage is applied through line 24 to the anode of the silicon control rectifier 3, capacitor 4 and resistor 5 simultaneously. A differentiated voltage spike developed by capacitor 4 and resistors 6, 7 and 8 is applied through the diode 9 to the gate of the silicon control rectifier 3 which causes it to conduct current. This current energizes the forward shifting coil through line 26. The 12 volts at resistor 5 forward biases the base of the transistor 10 causing the transistor 10 to conduct which places ground at the junction of resistors 11 and 12 preventing gate of the silicon control rectifier 13 from being being turned on. This prevents the silicon control rectifier 13 from conducting while the shifting lever is in the forward position. When the shifting lever is placed in a neutral position, the forward shifting coil circuit is now disengaged. Diode 14 is for reverse current protection from the collapsing field of the forward shifting coil. The resistor 49 discharges the capacitor 4.

When the shifting lever 2 is in the reverse position, 12 volts is applied through line 25 to the anode of the silicon control rectifier 13, capacitor 15 and resistor 16 simultaneously. Differentiated voltage spike is developed by capacitor 15 and resistors 11, 12 and 17 is applied to diode 18 to the gate of the silicon control rectifier 13 causing the silicon control rectifier 13 to conduct. The current through the silicon control rectifier 13 energizes the reverse shifting coil through line 27. The 12 volts at resistor 16 forward biases the base of the transistor 19 causing the transistor 19 to conduct and placing a ground at the junction of the resistors 6 and 7 which prevents gate circuit of the silicon control rectifier 3 from being turned on. This prevents the silicon control rectifier 3 from conducting while the shifting lever is in the reverse position. The diode 20 is reverse current protection from the collapsing field in the reversing shifting coil. The resistor 48 discharges the capacitor 15.

Current limiting resistor 28 and zener diode 29 supply operating voltage for the rpm detector circuit. The rpm trigger device input through resistor 30 and resistor 31 is to the base of the transistor 32. The transistor 32 conducts every time a pulse is received from the rpm trigger device. The capacitor 33 is a filtering means. Resistor 34 is used as a voltage divider for input resistors 30 and 31. The output voltage developed across resistor 35 is fed into the retriggerable one shot 36. The resistor 37 and capacitor 38 determine the output pulse width of the one shot 36. The positive output of the one shot 36 is applied to the voltage divider, resistors 39 and 40 and charges the capacitor 41. The voltage divider, resistors 42 and 43, establishes a reference voltage for the comparator 44. When the charge on the capacitor 41 exceeds the reference voltage of the comparator 44, the output of the comparator 44 goes positive. The charge of capacitor 41 is determined by the rpm of the power source. The positive voltage from the comparator 44 is coupled through diode 45 to the junction of resistors 46 and 47. Base current flows in transistors 19 and 10 causing both transistors to turn on. Ground is now applied to the gate circuits of silicon control rectifiers 3 and 13 inhibiting the silicon control rectifiers 3 and 13 from being turned on. This disables the shifting circuit above a predetermined rpm.

When the lockout and operate switch 1 is in the lockout position, the rpm detector and speed interlock circuits are disabled. However, the 12 volts is applied to the resistors 46 and 47 supplying base current to the transistors 19 and 10. This turns transistors 19 and 10 on and places gate circuits at the silicon control rectifiers 3 and 13 at ground which disables the shifting circuits.

OPERATION OF THE DEVICE

The circuit monitor and safety device is generally designated by the numeral 101 in FIG. 1. It is connected in series with the direct current electric shifting coils 103 and 104 which are operatively connected in a conventional manner to control rotation of a drive shaft, one coil to control rotation in one direction of rotation, such as a forward shifting coil and the other to control rotation in the opposite direction of rotation, such as that designated as the reverse shifting coil. The electrical coil shifting circuit monitor and safety device is physically located close to the shifting coils in the preferred embodiment. It includes three wiring connections: to a circuit to maintain a voltage equivalent to a coil shifting voltgage, ground return, and an input to an rpm detector and speed interlock circuit. The input to the safety device can be made from any pulse generating device associated to rpm's.

Referring to FIG. 1, preferably in the preferred embodiment an anti-theft lock operate switch 1 is shown, which is in the operating position. The circuit monitor continuously monitors for current flow in the shifting coil which is energized, depending upon whether it is the forward shifting coil or the reverse shifting coil. Silicon control rectifiers 3 and 13, which are current dependent, are provided. As long as there is current flow through the silicon control rectifiers, they will remain in a turned on condition. If there is an interruption in the supply voltage or the ground return to the coil shifting circuit for a short duration of time, the shifting circuit deactivates. The silicon control rectifier has lost its hold in current and stops conducting. Also, the back EMF generated by the collapsing field of the shifting coil back biases the silicon control rectifier. The silicon control rectifier under these circumstances is now off and cannot be turned on again until, the shifting lever has been returned to neutral and the rpm's of the shaft reduced to a point where the speed interlock voltage has been removed by the rpm detector circuit. At this time transistors 19 and 10 are turned off and the gate circuits of the silicon control rectifiers 3 and 13 are enabled. But for the device re-engagement of the shifting coil would normally have taken place in the conventional electric coil shifting systems causing severe mechanical damage to the drive mechanism. The circuit monitor device reduces the possibility of a mechanical failure of an electrical origin.

Another function of the circuit monitor device is to lock out the opposite coil shifting circuit, as well as the primary coil shifting circuit, that is, if the shaft is rotating at an rpm level above that which is predetermined and in a forward direction, the opposite or reverse and the primary shifting coil are electronically locked out. When the forward shifting coil silicon control rectifier 3 is turned on, the resistor 5 and transistor 10 are used to lock out the reverse shifting coil silicon control rectifier 13. Ground is placed in the gate circuit of the silicon control rectifier 13 by the transistor 10. When the reverse shifting coil silicon control rectifier 13 is turned on the resistor 16 and transistor 19 are used to lock out the forward shifting control silicon control rectifier 3. Ground is placed in the gate circuit of the silicon control rectifier 3 by the transistor 19. The opposite shifting coil lock out circuit will prevent a short circuit or leakage voltage between the shifting coil lines from engaging both shifting coils at the same time. This prevents mechanical damage that was of an electrical origin.

The safety device functions in the following manner. The input from the rpm trigger device is fed into the rpm detector and speed interlock circuit, transistor 32 and retriggerable one shot 36. At a predetermined rpm a lockout voltage is generated by the speed interlock comparator 44 to electronically lock out the coil shifting systems, both forward and reverse.

When one of the forward or reverse coil shifting circuits has been energized and the driving force, whether gasoline engine, electric motor, etc., has reached a predetermined rpm the coil shifting circuits are locked out.

The mechanical features of the electric coil shifting mechanism are now protected from accidental shifting. For example, if shifted from forward to neutral, it cannot be shifted back into forward or into reverse until the rpm level has been reduced. That is, a high rpm generates the lock out voltage from the speed interlock which is sensed and used to energize the cross coupled interlock circuits.

Another function of the safety device is the concealed lock operate switch 1. This switch places the system in operate or lock. If in the lock position, voltage is applied through resistor 46 to the transistor 19 and through the resistor 47 to the transistor 10, both transistors 19 and 10 are turned on. Ground is now placed in the gate circuits of the forward and reverse shifting coil circuits silicon control rectifiers 3 and 13. The shifting circuits are, therefore, inoperable until the lock operate switch 1 is placed in the operate position. In the manual lock position, the safety device now acts as an anti-theft protection. The shifting circuits are manually locked out under these circumstances by preventing activation of the coil shifting circuits and preventing movement of the object by unauthorized persons.

What is claimed is:

1. An improvement for an electric coil shifting mechanism including means operatively connecting the coil shifting mechanism to a shaft to be turned, said mechanism being operatively connected in a main circuit, the improvement which comprises, a current monitoring means to automatically disengage the mechanism from said main circuit and a forward circuit control means and a rearward circuit control means, a cross coupled interlock circuit means interconnecting the forward control circuit and the rearward control circuit means, and an rpm detector circuit, and a speed interlock circuit means, said rpm detector circuit and speed interlock circuit means being operatively connected to said main circuit;

said forward control circuit and the reverse control circuit each include silicon control rectifier circuit means including a resistor capacitor network and including a gate circuit network connected to the silicon control rectifiers, each RC network including a resistor divider and capacitors in series and each control circuit also including a discharge resistor in parallel with the respective associated capacitors of the RC network circuit means, said main circuit including a forward operating terminal and a rearward operating terminal and a forward shifting coil mechanism and a reverse shifting coil mechanism, in series with the respective forward and rearward operator terminals.

2. The device as set forth in claim 1 wherein said rpm detector circuit comprises a transistor means and a retriggerable one shot, said transistor being electrically connected to an rpm trigger device electrically connected to the rpm detector circuit and to the one shot and a voltage divider means between the rpm detector and the transistor base.

3. The device as set forth in claim 2 wherein said one shot consists of an integrated circuit with an input and an output, and said input being connected to the collector of the transistor and the output being connected to the voltage divider circuit means, means to provide a fixed voltage and means to equate pulses from the rpm detector to said fixed voltage, so that when pulses are at a predetermined rate, current will flow in the cross couple interlock circuit and permit current to flow to lock out the gate circuit of the associated circuits of the silicon control rectifier circuits included in said device.

4. The device as set forth in claim 1 wherein the cross coupled interlock circuit consists of a first and second transistor, said first transistor being connected through a resistor means to the main circuit and to the gate circuit of the reverse control circuit at the resistor divider of said reverse control circuit and said second transistor being connected through a resistor means ahead of the reverse control circuit means and the resistor divider of the gate of the forward control circuit means.

* * * * *